Figure 1:
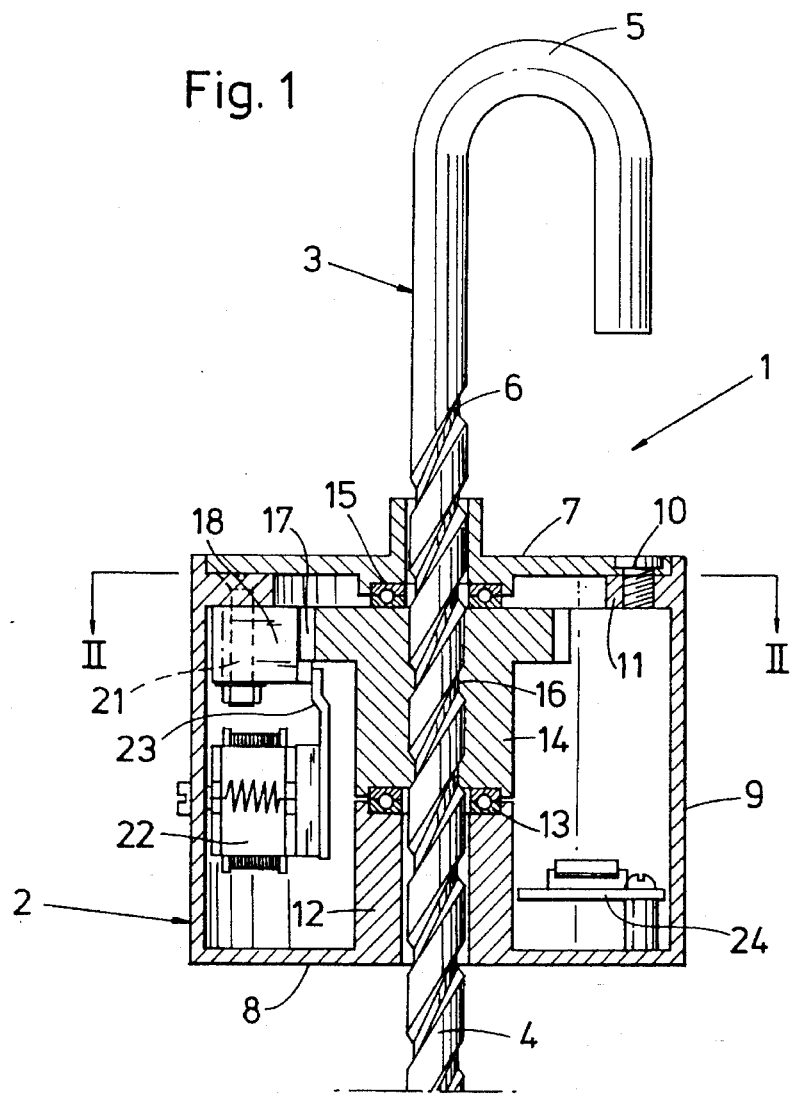

US005520033A

United States Patent [19]
Holmberg et al.

[11] Patent Number: 5,520,033
[45] Date of Patent: May 28, 1996

[54] VEHICLE ANTI-THEFT DEVICE

[76] Inventors: Björn Holmberg, Skyttbacksvägen 2, S-740 34 Skyttorp; Kjell-Åke Nilsson, Mellkvistvägen 7, S-686 00 Sunne, both of Sweden

[21] Appl. No.: 196,464

[22] Filed: Feb. 15, 1994

[30] Foreign Application Priority Data

Feb. 17, 1993 [SE] Sweden .................................. 93 00530

[51] Int. Cl.⁶ ...................................................... F16H 57/00
[52] U.S. Cl. ................................ 70/202; 70/254; 70/256; 70/237; 188/265
[58] Field of Search ............................... 188/265; 74/575; 70/34, 233, 234, 201–203, 181–187, 190–192, 193, 237, 239, 256, 257, 277, 278

[56] References Cited

U.S. PATENT DOCUMENTS

| 1,010,727 | 12/1911 | Corbin et al. | 70/217 X |
| 1,325,178 | 12/1919 | Trembley | 70/202 |
| 1,391,390 | 9/1921 | Knapp | 70/190 X |
| 1,408,652 | 3/1922 | Steinberg | 70/185 |
| 1,764,383 | 6/1930 | Bezek | 70/202 |
| 1,770,801 | 7/1930 | Perrelly | 70/202 |
| 2,078,724 | 4/1937 | Dupuis | 70/202 |
| 2,915,913 | 12/1959 | Molyneux | 70/184 X |
| 4,093,050 | 6/1978 | Mizuno | 188/265 X |
| 4,903,510 | 2/1990 | Surles | 70/202 |
| 5,040,387 | 8/1991 | Knott, Jr. | 70/202 |
| 5,107,692 | 4/1992 | Chen | 70/209 |
| 5,148,894 | 9/1992 | Eddy, Jr. | 188/265 X |
| 5,238,226 | 8/1993 | Nishimura | 74/575 X |
| 5,267,458 | 12/1993 | Heh | 70/202 X |

FOREIGN PATENT DOCUMENTS

| 22115 | 8/1930 | Australia | 188/265 |
| 74150 | 3/1989 | Japan | 188/265 |
| 8601557 | 4/1908 | Sweden . | |
| 2210344 | 7/1989 | United Kingdom . | |

*Primary Examiner*—Steven N. Meyers
*Assistant Examiner*—Suzanne L. Dino
*Attorney, Agent, or Firm*—Young & Thompson

[57] ABSTRACT

An anti-theft device (1) intended for vehicles belongs to a type, which is capable of retaining the vehicle brake in a braking condition, as long as it is activated, and which is non-interfering with the brake in an inactivated condition. The anti-theft device (1) comprises a lock rod (3) provided at one end with hook or crook (5) for gripping around a brake pedal arm (26), the lock rod (3) to a major extent consisting of a shank portion (4), which is releasably lockable within a lock housing (2), which in turn is firmly secured to the vehicle in the vicinity of the brake pedal. The shank portion (4), which is provided with a helicoidal groove (6), extends through the lock housing and through a rotatably disposed element (14) therein, the hole for the shank portion (4) through the rotatable element (14) having a helicoidal ridge (16), which is complementary to the helicoidal groove (6) in the shank portion (4) and cooperates therewith. Displacement of the lock rod (3) thus results in rotation of the rotatable element (14). A latch (18) is biased into engagement with the rotatable element (14) in order to permit the rotation of the rotatable element (14) in only one of its two rotational directions. A solenoid (22) is provided to move the latch (18) out of engagement with the rotatable element (14) when energized and thereby permit the free rotation of the rotatable element (14) in both of the two directions.

16 Claims, 2 Drawing Sheets

VEHICLE ANTI-THEFT DEVICE

The present invention relates to a anti-theft device intended for vehicles, and particularly to such an anti-theft device which, when activated, locks the brake pedal or the like in a braking condition.

Vehicle thefts constitute a growing problem, which is highly costly both to society and to the insurance companies. Although various anti-theft devices exist, such devices do not prevent a moderately advanced thief from driving the vehicle off. Due to frequent false alarms, alarm signals in the form of light and sound signals emitted from a vehicle do not attract any particular attention, and, considering the risks involved, few people would approach a potential thief at the moment of theft.

Various types of anti-theft devices exist, which are intended to prevent the vehicle from being driven. Probably, the most common type would be the steering wheel lock, this lock, however, being so weak as to be broken open by driving the vehicle with its front wheels up against a sidewalk edge. As a matter of fact, today the steering wheel lock is not considered to constitute a factual anti-theft device anymore. The same is true with respect to the gear lever locks, which may be opened by means of a screwdriver.

The separate locks to be applied between the steering wheel and one of the pedals, which not only prevents the driving of the vehicle but also makes it practically impossible for a person to be seated in the driver's seat, are of a stronger type. However, such locks entrain practical drawbacks in being big and unwieldy and thereby, when not in use, hard to place anywhere in the vehicle, as well as in making their application and removal difficult. It has also proved to be easy to cut off the steering wheel, e.g. by means of an ordinary hack saw, for a quick and easy removal of the lock.

It is true that .attempts to achieve a locking of one of the vehicle pedals in a theft-preventing position have been made, see e.g. SE 8601557-5 and GB-2 210 344 A. In the first document a complicated holding-down mechanism is proposed, which is easily accessible from its mounting position. In the case of an mechanism error occurring, there is a risk of the normal function of the brake pedal being obstructed, this possibly leading to collisions and other accidents. Further, it is to be manoeuvered by a lock mechanism having a key, this being known today not to constitute any problem whatsoever to a thief in breaking it open.

In the latter document, a mechanism is proposed, wherein the pedal position is lockable by means of a pin electromagnetically inserted into a fitting recess disposed in an arm, which extends from the pedal arm and transmits the pedal arm movements. This construction, too, is such as to be intended to be accommodated in the vehicle coupe adjacent to the pedal location, where only a few rigid portions are available for the attachment of the structure and where space further is limited. There is a risk, that it will interfere with the pedals, thus preventing them from being stepped on in a conventional manner. Further the construction is such, that pedal movements will be completely obstructed in a case where the pin is inadvertently pushed out. This construction therefore has to be considered as constituting a danger to traffic.

The present invention aims at eliminating the aforementioned problems. This object is achieved by a brake pedal lock of the kind made apparent by the appended patent claims, which also indicate the distinguishing features of the invention.

Figure 2:
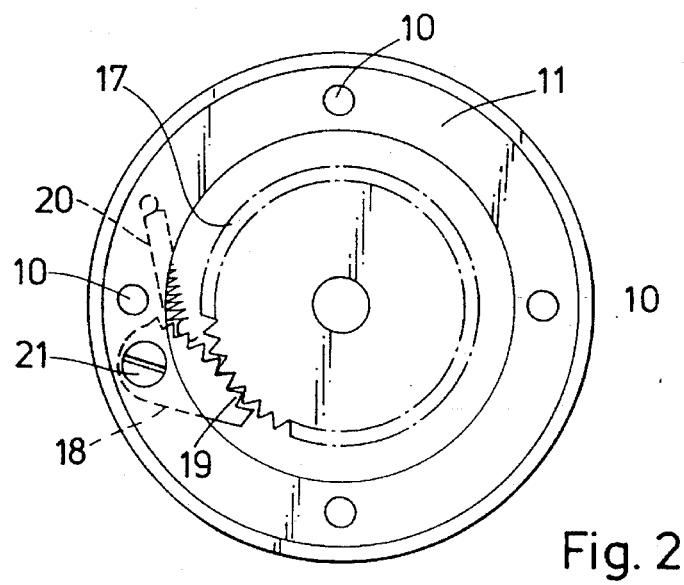
Figure 3:
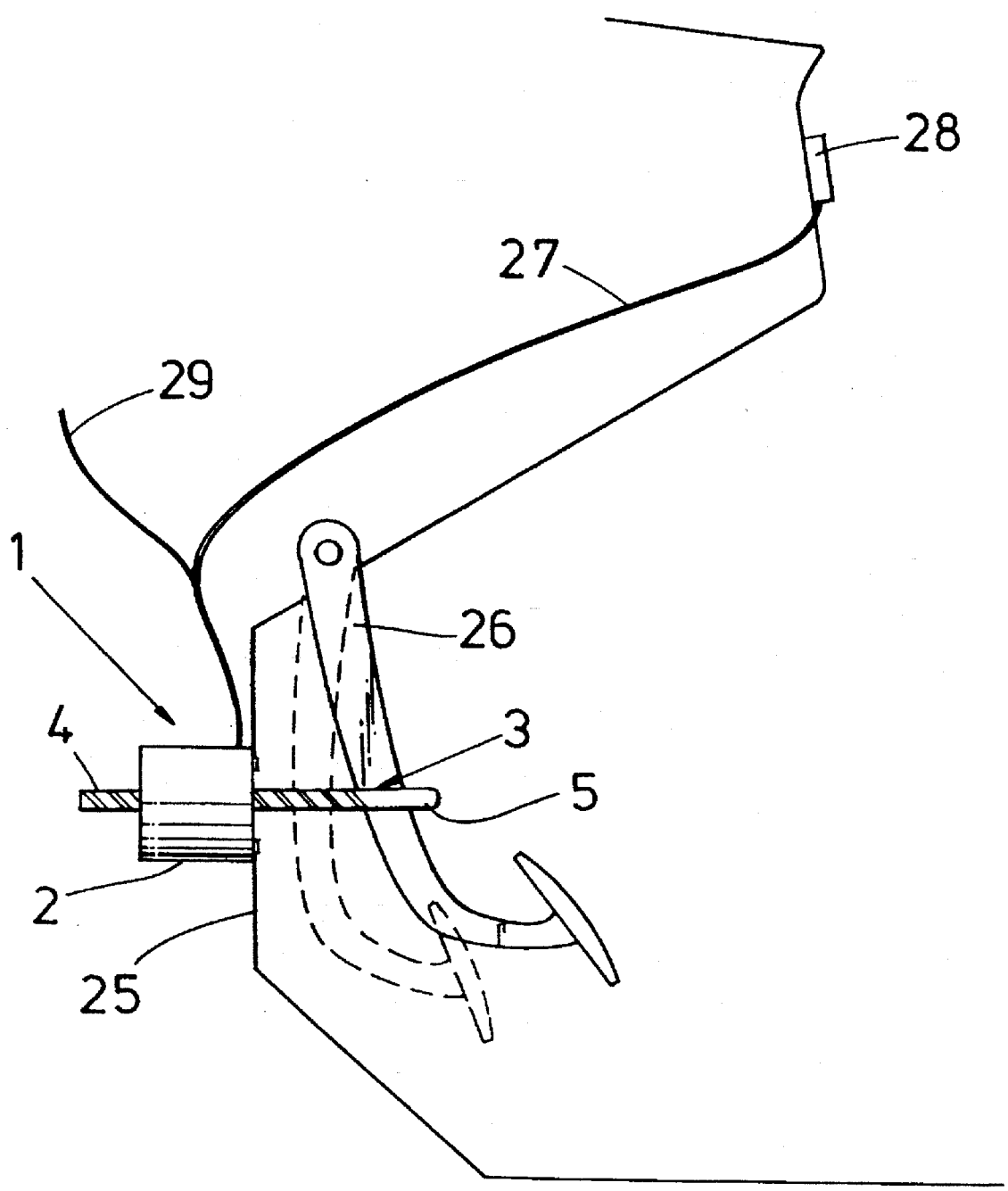

The invention will be described below in conjunction with the appended drawings, wherein FIG. 1 shows a partly cross-cut and partly cut-away view through a brake pedal lock according to the invention, FIG. 2 shows a schematical cross-cut along the line II—II of FIG. 1, and FIG. 3 shows a schematical cut-away and partly cross-cut view showing the brake pedal lock according to the invention in a mounted, operative position.

The brake pedal 1 according to the invention comprises a housing 2 intended to be permanently installed in a vehicle, and a lock rod 3 designed like a walking-stick having a shank 4 and a bow 5. The shank 4, which is displaceable through the housing 2 and lockable against moving in one of the two directions in optional positions with respect thereto, is provided with a helicoidal groove 6 disposed in its circumferential surface. The bow 5 is intended to be arranged around a movable element, primarily a brake pedal arm, and the helicoidal groove 6 extends from the bow to the free end of the shank 4.

The housing 2, which has a circular cross-section in the embodiment shown, is essentially formed like a can having two opposing, essentially planar end walls 7 and 8 and a surrounding wall 9. One of the end walls , 7, is attachable to the surrounding wall 9 by means of screws, not shown, which extend through holes in the wall 9 for screw fastening in threaded holes 10 in an inwardly protruding flange 11, which is integral with the surrounding wall 9. The opposing end wall 8 is integral with the surrounding wall 9 or possibly welded thereto.

The attaching of the housing 2 is effected in such a manner that the end wall 7 is turned to face e.g. the cowl wall of a car in the engine house, some screws suitably extending from the coupe side of the cowl wall through the holes of the end wall 7 to permit them to be screwed into the holes 10, whereas other screws will be concealed behind the cowl wall. As a result of such an installation, the housing 2 will not be openable from the engine house.

A manoeuvering and supporting shoulder 12 protrudes inwardly from the end wall 8 over a distance towards the opposing wall 7. At its inner end a ball bearing 13 supporting a rotatable element 14 is positioned. A second ball bearing is positioned between the rotatable element 14 and the end wall 7. A through hole for receiving the shank 4 extends from end wall to end wall 7, 8 and therethrough. In the rotatable element 14, the hole is provided with a helicoidal ridge 16, which is complementary to the helicoidal groove 6 in the shank 4. As the lock rod 3 is displaced with respect to the housing 2, the rotatable element 14 will thus rotate.

At one of its ends, in the illustrated embodiment the end, which is faced towards the loose end wall 7, the rotatable element 14 is provided with a toothed wheel rim 17. A swingable latch 18 is provided with teeth 19, which may be in engagement with the teeth of the toothed wheel rim 17 and which are biased to engagement therewith by means of a tension spring 20. The latch 18 is swingably attached through a screw 21 at the flange 11, which constitutes a shaft thereto and is parallel to the shank 4. One of the ends of the spring 20 is attached to the latch 18 in the vicinity of its teeth 19, its other end being attached to the flange 11. In connection therewith, the latch 18 is fundamentally arranged so that its teeth 19 grate across the teeth of the toothed wheel rim 17, as the rotatable element 14 rotates in one of the directions, whereas the teeth come into engagement in the other direction, the rotation of the rotatable element 14 thus being prevented.

In connection with the latch 18, a solenoid 22 mounted within the housing 2 has an arm 23 driven by the solenoid 22. The arm 23 is extended to the latch 18, but as long as the solenoid 22 is not energized, the arm 23 will be free from the latch 18. As the solenoid 22 is energized, its arm 23 is displaced towards the latch 18, swinging the latch away from engagement with the toothed wheel rim 17 teeth.

An electronic unit 24 also is positioned within the housing 2, and in this unit the conditions necessary to permit the energizing of the solenoid 22 are determined.

FIG. 3 schematically shows the way a brake pedal lock 1 according to the invention is intended to be installed in a vehicle. The housing 2 is, as previously described, screw fastened, riveted or fastened in any other way onto a cowl wall 25 on its engine house side. The lock rod 3 is positioned having its shank 4 extended through the cowl wall 25 and through the housing 2 and having the bow 5 placed around the brake pedal arm 26.

At a normal braking operation, the lock rod 3 will remain in its initial position, i.e. it will not participate in the brake pedal arm 2 movement and will thus not be displaced into the engine house. Thus, the pedal movements will not cooperate to any extent with the brake pedal lock, this excluding any form of interference therebetween. Further, the lock rod occupies an extremely small space so that it can not impede with the driver in properly manoeuvering the brake pedal. Should it, however, be desired to activate the brake pedal lock 1 according to the invention, i.e. to lock the car so as to prevent it from being driven off from its location, the brake pedal is to be depressed forcefully while pushing in the lock rod 3 by use of one's toes. In connection therewith, the rotatable element 14, as previously described, is made to rotate. When, after that, the pedal is relieved, it will be kept in place by the lock rod 3 and its bow 5 surrounding the brake pedal arm 26, and since the teeth at the latch 18 has come into engagement, a returning rotation of the element 14 will not be permitted. Thereby, the vehicle will be locked in a condition fixed through brake action.

A line 27, preferably protected, extends from the electronic unit 24 in the housing 2 to a control unit 28 on the dashboard. A line 29 further extends to the battery or the like for the manoeuvering current to the housing 2. In a suitable embodiment, the control unit 28 consists of a push button set and a display. The electronic unit 24 is programmed so as to energize the solenoid 22, thus enabling the releasing of the lock rod 3 permitting displacement, only as a result of a particular combination of push buttons being pushed down. The display indicates the status and the like in a conventional manner.

The housing 2 is made of a magnetic metal, which eliminates the possibility of influencing its mechanisms and other content by means of magnetic and/or electric action outside the housing 2, while at the same time being sufficiently strong to withstand such damage that may be inflicted thereto in a space as small as that in an engine house or at a pedal stand in a vehicle. The location involving a number of the screws for opening of the housing 2 facing the cowl wall, in a locked condition makes the housing 2 pressed against the cowl wall and retained there, making it impossible to remove the screws. Although it is possible to unscrew the screws fixing the housing 2 on the cowl wall 25, no access will be possible with respect to the screws, which permit the housing 2 to be ,opened. The more severe the damage inflicted on the brake pedal lock 1 according to the invention gets, the harder or further the lock rod 3 will be pushed through the housing 2 and the harder the housing 2 will be pulled against the cowl wall 25. The helix 6, which is cut in the shank 4 of the lock rod 3, has a pitch such that the force exerted at the latch 18 will be comparatively small, also in a case where this force, at an attempt to pull the lock rod 3 out of the housing 2, is very high. This results in a high amount of security in combination with the fact that the latch 18, when being damaged, will be restrained between the surrounding wall 9 of the housing 2 and the toothed wheel rim 17 on the rotatable element 14. The only way of having the brake pedal released in order to make the vehicle driveable, should be to break the sheet of the cowl wall 25 around the housing 2, so that it may participate in the movements of the brake pedal arm, such an action, however, being too complicated and time-consuming to be possible to accomplish in order to steal a vehicle.

In order to have the latch 18 released so that the lock rod 3 will be releasable, it is required that the solenoid 22 be energized as well as the lock rod 3 be pushed inwardly to a small extent, so that the engagement between the teeth becomes loose. Only then will it be possible to swing the latch away. Each attempt to damage the electrical system results in the latch being in all respects prevented from being swung to the side. It will thus be necessary to destroy the housing 2, an action, which will be impossible to accomplish during the short period of time available to a thief for stealing a vehicle without being discovered.

The embodiment described herein may be considered to be a universal anti-theft device suitable to most vehicles. It will, however, be appreciated that this anti-theft device may be designed in various ways for certain special vehicles without thereby deviating from the scope of the invention. This, as well as such fundamental prerequisites as a tempered steel or a similarly heavy-duty material for the various components, a suitable pitch for the helix 6, a design for the component of the lock rod 3 cooperating with the brake pedal arm, the shape of the housing 2 etc., will be completely evident to a person skilled in the art.

We claim:

1. An anti-theft device (1) intended for vehicles and belonging to a type which retains a vehicle brake in a braking condition, when the anti-theft device is activated, which anti-theft device comprises a lock rod (3) provided at one end with a grip means (5) for gripping around a brake pedal arm (26) and arranged to be in a releasable locking engagement in a lock housing (2), the lock rod (3) having a shank portion (4) connected to the grip means (5) and having a helicoidal groove (6) extending through the lock housing (2), a rotatable element (14) disposed within the lock housing (2) and provided with a through hole for receiving the shank portion (4), the through hole having a helicoidal ridge (16) complementary to the helicoidal groove (6) in the shank portion (4) and cooperating therewith, so that a displacement of the shank portion (4) of the lock rod (3) through the lock housing (2) rotates the rotatable element (14), a latch (18) biased into a locking engagement with the rotatable element (14) in order to prevent a rotation thereof in one rotational direction, and a means (22,23) for releasing the latch (18) to take the latch (18) out of the engagement with the rotatable element (14) and enable the rotation thereof in any rotational direction.

2. The anti-theft device according to claim 1 wherein the means for releasing the latch consists of a solenoid (22) having an arm (23) connected thereto, the arm (23), as the solenoid is energized, being driven by the solenoid into contact against the latch (18) and to further pivoting thereof from the engagement position.

3. The anti-theft device according to claim 1 wherein the rotatable element (14) is provided around its periphery with a toothed wheel rim (17), and the latch (18) is provided with a toothed segment (19), the teeth being respectively arranged to be in engagement with each other.

4. The anti-theft device according to claim 1 wherein the latch (18) is pivotable around an axis (21), the axis (21) being parallel to the rotational axis of the rotatable element (14) and biased through a spring (20) against the rotatable element (14), the latch (18) being extended to such a degree wherein in a non-influenced condition the latch (18) permits the rotation of the rotatable element (14) only in one rotational direction.

5. The anti-theft device according to claim 1 wherein the solenoid is controlled by means of an electronic unit (24), controlled by a control unit (28), the electronic unit supplying current to manoeuver the solenoid (22) so as to release the latch provided a particular code has been given at the control unit (28).

6. The anti-theft device according to claim 2 wherein the rotatable element (14) is provided around its periphery with a toothed wheel rim (17), and the latch (18) is provided with a toothed segment (19), the teeth being respectively arranged to be in engagement with each other.

7. The anti-theft device according to claim 2 wherein the latch (18) is pivotable around an axis (21), the axis (21) being parallel to the rotational axis of the rotatable element (14) and biased through a spring (20) against the rotatable element (14), the latch (18) being extended to such a degree wherein in a non-influenced condition the latch (18) permits the rotation of the rotatable element (14) only in one rotational direction.

8. The anti-theft device according to claim 3 wherein the latch (18) is pivotable around an axis (21), the axis (21) being parallel to the rotational axis of the rotatable element (14) and biased through a spring (20) against the rotatable element (14), the latch (18) being extended to such a degree wherein in a non-influenced condition the latch (18) permits the rotation of the rotatable element (14) only in one rotational direction.

9. The anti-theft device according to claim 6 wherein the latch (18) is pivotable around an axis (21), the axis (21) being parallel to the rotational axis of the rotatable element (14) and biased through a spring (20) against the rotatable element (14), the latch (18) being extended to such a degree wherein in a non-influenced condition the latch (18) permits the rotation of the rotatable element (14) only in one rotational direction.

10. The anti-theft device according to claim 2 wherein the solenoid is controlled by means of an electronic unit (24), controlled by a control unit (28), the electronic unit supplying current to manoeuver the solenoid (22) so as to release the latch provided a particular code has been given at the control unit (28).

11. The anti-theft device according to claim 3 wherein the solenoid is controlled by means of an electronic unit (24), controlled by a control unit (28), the electronic unit supplying current to manoeuver the solenoid (22) so as to release the latch provided a particular code has been given at the control unit (28).

12. The anti-theft device according to claim 4 wherein the solenoid is controlled by means of an electronic unit (24), controlled by a control unit (28), the electronic unit supplying current to manoeuver the solenoid (22) so as to release the latch provided a particular code has been given at the control unit (28).

13. The anti-theft device according to claim 6 wherein the solenoid is controlled by means of an electronic unit (24), controlled by a control unit (28), the electronic unit supplying current to manoeuver the solenoid (22) so as to release the latch provided a particular code has been given at the control unit (28).

14. The anti-theft device according to claim 7 wherein the solenoid is controlled by means of an electronic unit (24), controlled by a control unit (28), the electronic unit supplying current to manoeuver the solenoid (22) so as to release the latch provided a particular code has been given at the control unit (28).

15. The anti-theft device according to claim 8 wherein the solenoid is controlled by means of an electronic unit (24), controlled by a control unit (28), the electronic unit supplying current to manoeuver the solenoid (22) so as to release the latch provided a particular code has been given at the control unit (28).

16. The anti-theft device according to claim 9 wherein the solenoid is controlled by means of an electronic unit (24), controlled by a control unit (28), the electronic unit supplying current to manoeuver the solenoid (22) so as to release the latch provided a particular code has been given at the control unit (28).

* * * * *